(12) United States Patent
McMullen et al.

(10) Patent No.: US 9,392,402 B1
(45) Date of Patent: Jul. 12, 2016

(54) COMMUNICATION OF EVENTS DEPICTED IN MEDIA TO A WIRELESS DEVICE

(71) Applicant: Sprint Communications Company L.P., Overland Park, KS (US)

(72) Inventors: Michael P. McMullen, Leawood, KS (US); Rodney D. Nelson, Overland Park, KS (US); John R. Schuler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 95 days.

(21) Appl. No.: 14/178,027

(22) Filed: Feb. 11, 2014

Related U.S. Application Data

(63) Continuation of application No. 12/142,665, filed on Jun. 19, 2008, now Pat. No. 8,700,007.

(51) Int. Cl.
*H04L 29/06* (2006.01)
*H04W 4/02* (2009.01)
*H04W 8/22* (2009.01)

(52) U.S. Cl.
CPC . *H04W 4/02* (2013.01); *H04W 8/22* (2013.01)

(58) Field of Classification Search
CPC .......... H04W 4/02; H04W 64/00; H04W 8/22
See application file for complete search history.

(56) References Cited

U.S. PATENT DOCUMENTS

| | | | |
|---|---|---|---|
| 6,823,256 B1* | 11/2004 | Burt | 701/537 |
| 8,290,513 B2* | 10/2012 | Forstall et al. | 455/456.3 |
| 8,522,143 B2* | 8/2013 | Figueroa | 715/719 |
| 2007/0038950 A1* | 2/2007 | Taniguchi et al. | 715/768 |
| 2009/0005975 A1 | 1/2009 | Forstall et al. | |
| 2009/0143977 A1 | 6/2009 | Beletski et al. | |
| 2009/0258636 A1 | 10/2009 | Helvick | |

OTHER PUBLICATIONS

Notice of Allownace mailed Nov. 25, 2013 in U.S. Appl. No. 12/142,665.
Advisory Action mailed Nov. 7, 2011 in U.S. Appl. No. 12/142,665.
Final OA mailed Aug. 30, 2011 in U.S. Appl. No. 12/142,665.
Non Final OA mailed May 18, 2011 in U.S. Appl. No. 12/142,665.
Suzanne Ross, "Shot on Location: A World-Wide Image Database," Available at: http://research.microsoft.com/displayArticle.aspx?id=598, Date Accessed: Jun. 19, 2008.
Robyn Peterson, "Inside Microsoft's New Digitial Photo Project," Feb. 6, 2004, Available at: http://www.extremetech.com/article2/0%2C1697%2C1518543%2C00.asp.
Tim Waters, "Deep geotagging of videos—Motionbox," Oct. 22, 2006, Available at: http://thinkwhere.wordpress.com/2006/10/22/deep-geotagging-of-videos-motionbox/.

(Continued)

*Primary Examiner* — Ajit Patel

(57) ABSTRACT

A method, system, and medium are provided for determining the geographic location associated with events depicted in media. The geographic locations can be provided by creators of the media, or by users who view the media. The geographic locations can then be stored in a database on a server. A determination can be made as to whether the geographic locations are within a predefined distance of the geographic location of a wireless device. A set of events located within the predefined distance can be presented to a user of the wireless device.

18 Claims, 6 Drawing Sheets

(56) References Cited

OTHER PUBLICATIONS

"GPS Tagging," Available at: http://alpha.bambuser.comigeotagging , Date Accessed: Jun. 19, 2008.

"The Internet Movie Database," Available at: www.imdb.com , Date Accessed: Jun. 19, 2008.

"CacheDragon 1.1," , Available at: http://www.soft32.com/download_157137.html , Date Accessed: Jun. 19, 2008.

* cited by examiner

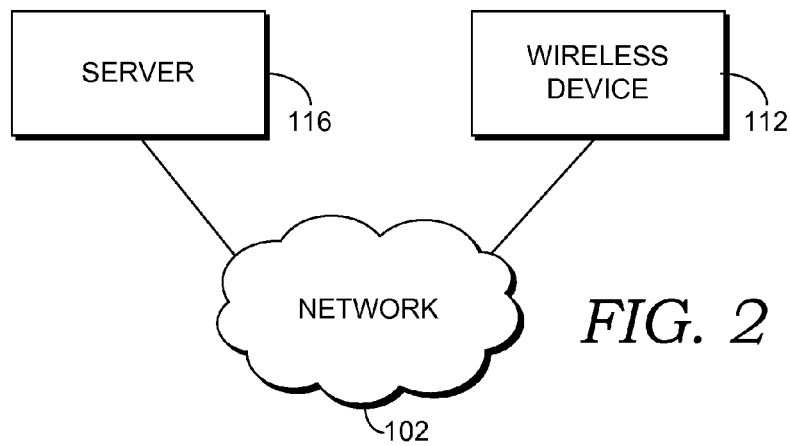

COMMUNICATION OF EVENTS DEPICTED IN MEDIA TO A WIRELESS DEVICE

PRIORITY

This application is a continuation of U.S. Ser. No. 12/142,665, entitled "Communication Of Events Depicted In Media To A Wireless Device," filed on Jun. 19, 2008, which is herein incorporated by reference in its entirety.

BACKGROUND

Users often desire to know the geographic location associated with an event in media that they are experiencing. For visual forms of media, such as video and still pictures, the associated geographic location can be an event and/or scene from the video or still picture. In other forms of media, such as audio or written works, the associated geographic location can be that of an event or scene described by the audio or written work.

SUMMARY

The invention is defined by the claims below. A high-level overview of embodiments of the invention are provided here for that reason, to provide an overview of the disclosure. In a first embodiment, a method is provided for determining whether events depicted in media coincides with a geographic location. The method comprises receiving a request from a wireless device to identify a geographic location of events depicted in media. The request comprises a geographic location describing the location of the wireless device. A determination is made by as to whether the geographic location of events depicted in the media is within a geographic radius of the geographic location of the wireless device by consulting databases. A set of events depicted in the media is presented where the events presented are located within a geographic radius of the wireless device.

In a second embodiment, a computer-readable medium with computer executable instructions embodied thereon are provided for performing a method of communicating from a server to a wireless device geographic locations associated with events depicted in media. The method comprises determining a geographic location associated with events depicted in the media. The geographic location is then stored on a computer-readable media. The geographic location associated with the events depicted in the media is then communicated to a wireless device.

In a third embodiment, a system is provided that comprises a server for receiving geographic locations associated with a wireless device, a wireless device for receiving information from the server component, the information comprising the geographic location of events depicted in forms of media, and a network for providing communication between the server component and the wireless device component.

BRIEF DESCRIPTION OF THE SEVERAL VIEWS OF THE DRAWINGS

Illustrative embodiments of the invention are described in detail below with reference to the attached drawing figures, which are incorporated by reference herein and wherein:

FIG. 2 depicts an exemplary network system in accordance with an embodiment of the invention;

FIG. 3 depicts a screen shot of a user interface of a wireless device, according to an embodiment of the invention;

FIG. 4 depicts a screen shot of a user interface of a wireless device, according to an embodiment of the invention;

DETAILED DESCRIPTION

Embodiments of the invention provide methods, computer-readable media, and systems for determining by a wireless device whether events depicted in media coincide with a geographic location. Other embodiments of the invention provide for communicating geographic locations associated with events depicted in media to a wireless device.

Various technical terms are used throughout this description. An illustrative resource that fleshes out various aspects of these terms can be found in Newton's Telecom Dictionary by H. Newton, $24^{th}$ Edition (2008).

Embodiments of the invention include, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
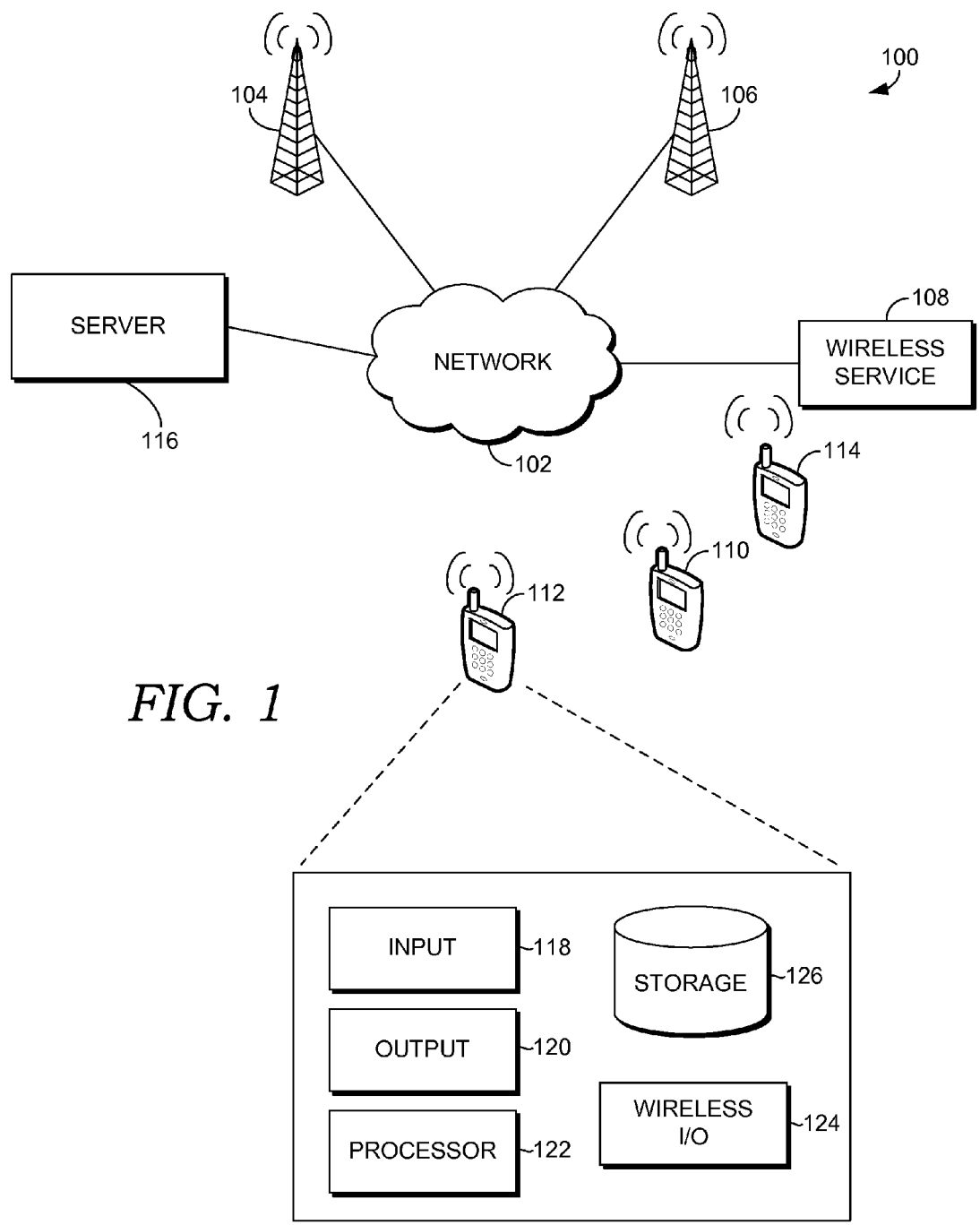
FIG. 1 depicts an exemplary wireless device communication network system in accordance with an embodiment of the invention.

Turning now to FIG. 1, a depiction of a wireless device communication network system is presented, in accordance with an embodiment of the invention. The system includes network 102, which may be any type of network as known in the art, such as, but not limited to, the Internet, an intranet, a local area network (LAN), or a wide area network (WAN). As such networks are well known in the art, no further discussion will be provided. Base stations 104 and 106 are communicatively connected to the network 102 and provide for the communication between the wireless devices 110, 112, and 114 that have wireless communication abilities and the network 102 and, in turn, the mobile service provider 108. The operation of base stations 104 and 106 are well known, and as such, will not be discussed further.

Mobile service provider 108 can be any that provides communication services to users of wireless devices 110, 112, and 114. Server 116 can be administered by the mobile service provider 108 and communicate with the mobile service provider 108 over the network 102. Server 116 contains databases for the storage of information that is provided to the wireless device 110, 112, and 114. Additionally, while shown in FIG. 1 as being a separate component, server 116 can be located within the mobile service provider 108. Server 116 is communicatively connected to the network 102, as well.

Wireless devices 110, 112, and 114 can take many forms, such as cell phones, smart phones, PDAs, or any other computing device that is capable of being readily transportable. Although specific mention is made in FIG. 1 and the foregoing discussion of wireless devices that are capable of wireless communication with either the server 116 of the mobile service provider 108, embodiments of the invention should not be construed as being limited to wireless devices that have such communication abilities. For instance, instead of utilizing wireless devices, mobile devices that do not have wireless communication capabilities can be used in accordance with embodiments of the invention. In such mobile devices, methods are provided for the input and output of information in the mobile device that do not require wireless communication.

While only two base stations 104 and 106 and three wireless devices 110, 112, and 114 are depicted, it should be understood that a multitude of base stations 104 and 106 and wireless devices 110, 112, and 114 may be utilized according to embodiments of the invention. The simplified depiction in FIG. 1 is provided to aide in the understanding of the concepts of embodiments of the invention, and is not intended to be limiting in nature. Additionally, while three wireless devices 110, 112, and 114 are depicted in FIG. 1, mention will only be made to one wireless device 112 throughout the remainder of this description.

Wireless device 112 is comprised of an input component 118, an output component 120, a processor component 122, a storage component 126, and a wireless input/output (I/O) component 124. Wireless device 110 contains the same or similar components. Input component 118 provides for the input of information in the wireless device 112. It can take the form of a keypad, keyboard, selection device, mouse, track ball, voice recognition, USB port, communication port, or any other form that provides for the input of information into the wireless device.

Output component 120 provides for the output of information from the wireless device 112. It can take the form of components for the output of visual, digital (such as a USB or communication port), audible, vibratory, or other forms of information. Visual forms of the output component 120 can take the form of an LCD display, plasma display, or any other display method that provides for the presentation of visual information to a user of the wireless device 112.

Processor component 122 provides computer processing functionality for the wireless device 112. Processor component 122 serves to control the functioning of the wireless device 112 and the functioning of the associated components.

Storage component 126 provides for the storage of information on the wireless device 112. It can take the form of a hard disk drive, differing types of computer memory, or any other suitable computer storage media. Common to all types of storage components 126 is the ability to store computer executable instructions.

Wireless I/O component 124 provides for the communication of wireless device 112 with the network 102 through base stations 104 and 106. As discussed above, wireless devices may not have a wireless I/O component 124, according to some embodiments of the invention. Wireless I/O component 124 can take many forms, such as a receiver and transmitting module, for the reception of radio frequency waves and generation of the same. Common to all forms of wireless I/O 124 components is the ability to send and receive communications wirelessly.

With reference now to FIG. 2, an exemplary network system is provided in accordance with an embodiment of the invention. The system is comprised of the server 116 and wireless device 112 communicatively coupled together through the network 102. FIG. 2 provides a more high-level description of an exemplary operating environment of the invention.

As described above, server 116 can contain databases thereon for the storage of information. The databases can reside on forms of computer-readable media in accordance with embodiments of the invention.

The information in the databases hereinafter referred to in the singular form, can be geographic location information associated with events depicted in forms of media. An 'event' for the purposes of discussion herein is an act or occurrence presented within media. In video media, such as motion pictures, an event could be a scene in the motion picture media. In forms of audio media, an event could be the description or mention of a geographic location. With forms of media such as written works, an event can take the form of any description of a particular geographic location. It should be understood that for any particular media, a plurality of events can be identified within the media. For example, visual forms of media can contain multiple events, i.e. scenes.

The database can be constructed such that for events depicted in media, multiple geographic locations can be associated therewith. An example of one geographic location is that of where the event depicted in the media was created. In the case of a video form of media, this can be the geographic location where the video was created. For a motion picture, this could be the location where it was filmed.

Another example of geographic location that can be associated with an event is that of where the creators of the media intend a user to believe the event occurred. This is common in video media, which can be created in one geographic location in such a manner as to lead a user to believe that it was actually created in another geographic location. For instance, many motion pictures are filmed in southern California, while the storyline of the motion picture may actually be set in a different location. The user viewing the motion picture is then lead to believe the motion picture was actually filmed in the location of the storyline of the motion picture, when in reality it was filmed on a film studio back lot in southern California.

While specific examples have been made of visual media, other forms of media are contemplated as well by the embodiments of the invention. These forms of media could be audio or visual in nature, and would include written works as well. For instance, geographic locations associated with audio forms of media could be stored in the databases on the server 116. For example, if an audio recording mentioned or described a geographic location, that geographic location can be stored in the databases along with identifying information for the audio recording. In the case of a particular musical song recording that described or made mention to a geographic location, the name and/or author of the musical song can be stored in the database along with the geographic location.

The geographic locations associated with events depicted in forms of media can be provided to the database according to a number of methods. The geographic locations can be supplied by the creators of the media. In this embodiment, the author of a written work would supply the geographic location associated with events in their written work. Creators of visual and audio media would likewise be able to do the same through various methods. According to one embodiment, the geographic location associated with an event could be embedded into the media as a tag. This tag could be imperceptible to the user as metadata. In other embodiments of the invention, the contents of tag could be presented concurrently with the media. An example of this embodiment would be similar closed-captioning, where instead of text representing audible information being displayed in video media, the text would display the geographic location for the event being presented to the user.

Other embodiments can permit users to supply geographic locations associated with events in forms of media. This could take the form of users providing their submissions to the database over the network 102 into a web page communicatively coupled to the server 116. Users could also define events within a particular media, and then subsequently provide geographic locations associated with the events. This could be a collaborative process, with any number of users contributing what they believed to be the geographic location associated with an event. A user could then rate the submissions of other users for perceived accuracy and/or veracity. This could take the form of a rating or ranking method, with geographic locations associated with an event receiving higher rankings or ratings if they are believed by other users to be more accurate.

Turning now to FIG. 3, a screen shot is presented of a wireless device, according to an embodiment of the invention. The user interface 302 of the wireless device is comprised of the prompt 304, entry field 306, and submission indicator 308. The prompt 304 is presented through the output component of the wireless device. The prompt 304 is presented to the user in response to an input provided to the wireless device through the input component. The type of input can take many forms, for example it could be the selection of a program or shortcut in the wireless device. The prompt 304 contains language soliciting information from the user as the name of the media that they are seeking the geographic location for. The user then is able to enter this information into the entry field 306 and submit the information with the selection of the submission indicator 308. The submission indicator 308 can be selected through the use of any input method available to the input component.

After selection of the submission indicator 308, the information input in the entry field 306 is communicated to the server over the network. In a wireless device that has wireless communication capabilities, this communication can be effectuated through the use of the wireless I/O component. The information is wirelessly communicated to the base stations for subsequent communication over the network to the server. In wireless devices that have no wireless communication capabilities, the output component can be used to communicate the information to the server through the network. Additionally, this form of communication can also be used in a wireless device that has wireless communication capabilities.

With reference now to FIG. 4, a depiction of a screen shot of a wireless device is presented in accordance with an embodiment of the invention. The user interface 402 of the wireless device is comprised of the prompt 404, entry field 406, and submission indicator 408. The prompt 404 is presented through the output component of the wireless device. The prompt 404 is presented to the user in response to an input provided to the wireless device in response to the prompt, as described in relation to FIG. 3. The prompt 404 contains language soliciting information from a user describing a scene or event from the media that they are seeking the geographic location of. The name of the media could have been provided as described in FIG. 3, and the prompt 404 can be customized to include the name of the media. The user then is able to enter this information into the entry field 406, and submit the information with the selection of the submission indicator 408. The submission indicator 408 can be selected through the use of any input method available to the input component.

After selection of the submission indicator 408, the information input in the entry field 406 is communicated to the server over the network. In a wireless device that has wireless communication capabilities, this communication can be effectuated through the use of the wireless I/O component. The information is wirelessly communicated to the base stations for subsequent communication over the network to the server. In wireless devices that do not have wireless communication capabilities, the output component can be used to communicate the information to the server through the network. Additionally, this communication can also be used in a wireless device that has wireless communication capabilities.

In embodiments of the invention, the information input into the entry fields 306 and 406 can be communicated in conjunction with each other to the server. In addition, the prompts 304 and 404 can be combined into a single user interface. While specific mention has been made to the presentment and input of information through text and visual methods, other presentment and input methods are contemplated as well. These could include the use of tactile or audio presentment methods, as well as similar input methods.

Figure 5:
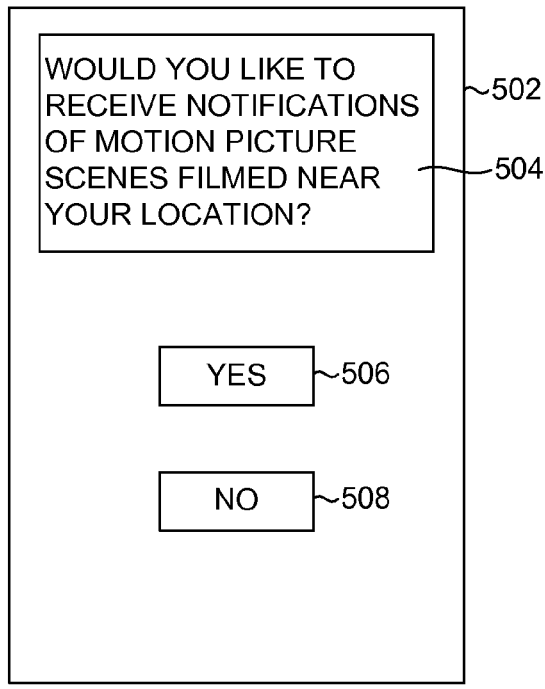
FIG. 5 depicts a screen shot of a user interface of a wireless device in accordance with an embodiment of the invention.

Turning now to FIG. 5, a screen shot is presented of a wireless device in accordance with an embodiment of the invention. The user interface 502 of the wireless device is comprised of a notification 504 and an affirmative response indicator 506 and a negative response indicator 508. The notification 504 can be presented to the user of the wireless device through the output component. It can contain text inquiring as to whether the user desires to receive notification of events depicted in media near their geographic location. The embodiment depicted in FIG. 5 relates to a specific subset of forms of media, in this case motion pictures. Other notifications 504 could be broader in nature, and inquire as to all forms of media, or even specific genres of media.

The geographic location of the user and their wireless device can be determined through a number of methods. The geographic location can be determined through the use of GPS, triangulation, user self-reported location information, or any other suitable location determination method.

Upon a user selecting the affirmative response indicator 506 through the use of the input component of the wireless device, a communication can be initiated to the server. The communication could be comprised of a number of pieces of information, including, but not limited to: the geographic location of the wireless device and information regarding the event or media that the user would like to receive notifications when in proximity thereto. In embodiments of the invention using a wireless device with wireless communication capabilities, this communication could occur to methods discussed in relation to FIG. 4. In other embodiments of the invention the communication can be effectuated through the output component of the wireless device, as described in relation to FIG. 4.

After receiving the communication, the server can consult the database to determine the events or forms of media that are located near the user and respective wireless device's geographic location. The definition of near can vary, and can be defined by either the user of wireless device or the server. For instance, a user could set it at 10 miles or 100 miles, or any other denomination. The geographic location of the events or forms of media that are near the geographic location of the user and the wireless device is then communicated to the wireless device. This can be an ongoing process, where the wireless device periodically communicates to the server its respective location. The content of the communicated information can include the geographic location of each event or media, as well as information about the particular event or media. Additionally, as described above, more than one geographic location can be provided for a particular event or media.

In other embodiments of the invention, the server can communicate all of the events or forms of media and associated geographic location information to the wireless device, without regard to the distance between the wireless device and the respective geographic locations of the events or forms of media. This would be useful in embodiments of the invention that utilize wireless devices without wireless communication abilities. The wireless device can then determine when the user and the wireless device are near an event depicted in media and provide the notification to the user.

Figure 6:
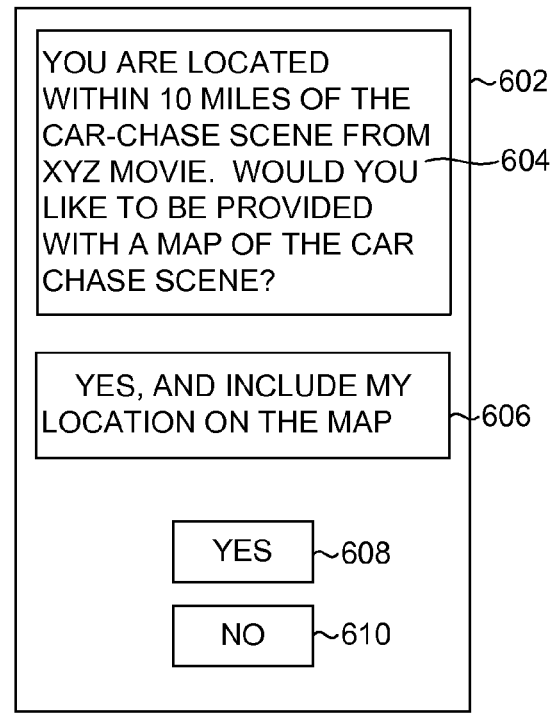
FIG. 6 depicts a screenshot of the geographic location of an event depicted in media, according to an embodiment of the invention.

With reference now to FIG. 6, a screen shot of a user interface of a wireless device depicting the geographic location of an event depicted in media is presented, according to an embodiment of the invention. The user interface 602 of the wireless device comprises a notification 604, location response indication 606, affirmative response indicator 608, and negative response indicator 610.

Alert 604 contains information that can presented to a user of the wireless device upon a determination being made that the wireless device is located within a predefined distance from an event depicted in media. The information can be presented to the user through the output component of the wireless device. The alert 604 can be generated in accordance with a determination made in conjunction with methods discussed in relation to FIG. 5, above. The content of the alert 604 can include information describing the event depicted in media and the distance from the location of the wireless device. The alert 604 can also provide the user with a query as to whether they want to be provided with a map of the event depicted in media.

In FIG. 6, the event depicted in media is a car-chase scene from a motion picture. The user is given the option to be presented with a map that includes their position when location response notification 606 is selected. The user can select to be provided with a map of the location of the event depicted in media by selecting affirmative response indicator 608. Alternatively, the user can opt not to receive a map by selecting the negative response indicator 610. All of the aforementioned selection operations can be effectuated through the use of the input component of the wireless device.

Figure 7:
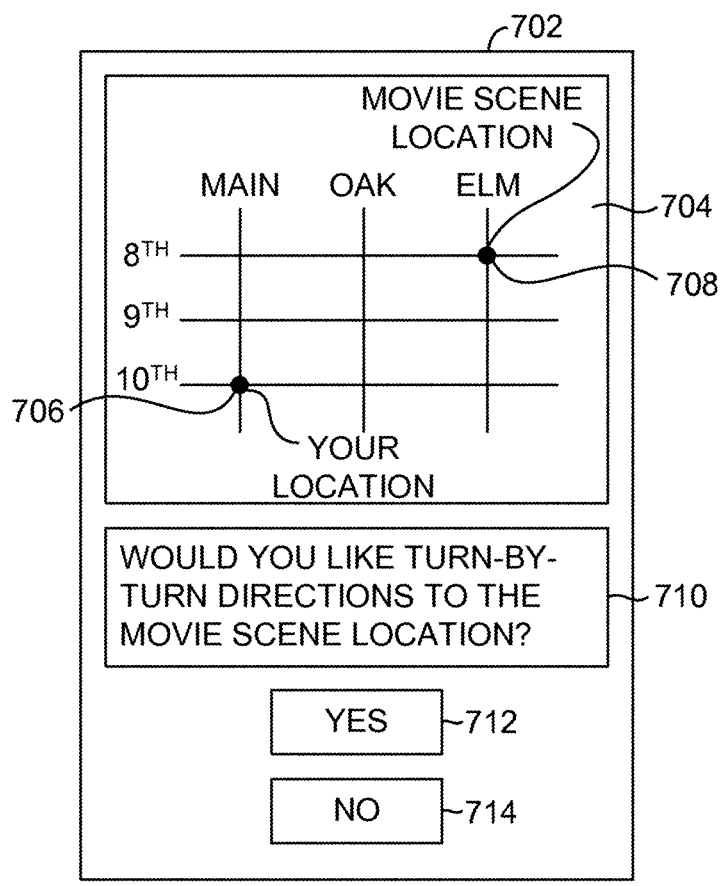
FIG. 7 depicts a screen shot of a user interface of a wireless device in accordance with an embodiment of the invention.

Turning now to FIG. 7, a screen shot of a user interface of a wireless device is depicted in accordance with an embodiment of the invention. The user interface 702 of the wireless device is comprised of a map 704, query 710, affirmative response indicator 712, and negative response indicator 714. The map 704 is generated in response to the selection of the user received in conjunction with FIG. 6.

The map 704 provides an indication of geographic features and the location 708 of the event depicted in media overlaid on the map 704. Additionally, if the user selected the response indicating they desired to have their location displayed on the map 704, the user location 706 would be presented as well. The map 704 can be generated by the wireless device based on geographic data either stored on the wireless device or otherwise available via the input/output components, or through the wireless I/O, if such capability is present. Other embodiments of the invention can receive the map 704 from the server, communicated over the network to the wireless device.

Query 710 solicits from the user a response as to whether they desire directions to the location 708. If the user selects the affirmative indicator 712, the wireless device can provide directions to the location 708. In other embodiments of the invention, the wireless device can communicate with the server to generate directions to the location 708. Alternatively, upon no selection by the user or a selection of the negative response 714, directions will not be provided to the location 708.

Figure 8:
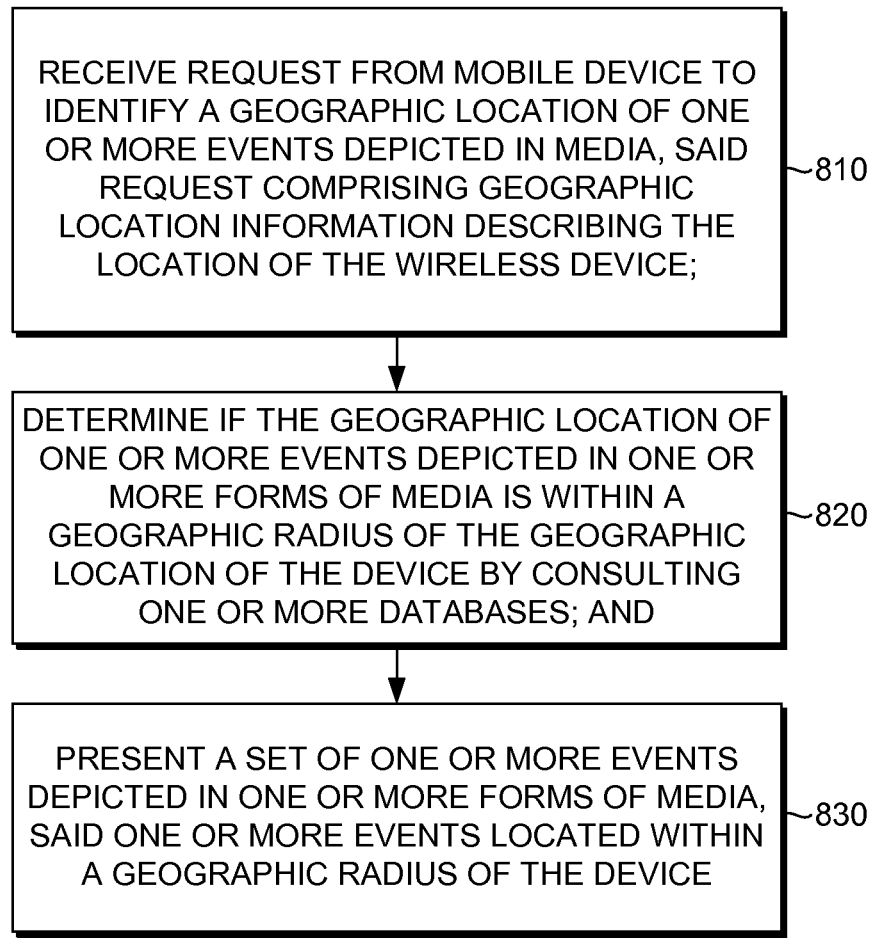
FIG. 8 depicts a flow diagram for a method of determining whether events depicted media coincides with a geographic location.

With reference now to FIG. 8, a flow diagram is presented for a method of determining whether events depicted in media coincide with a geographic location, according to an embodiment of the invention. The method begins in block 810 with the reception of a request from a wireless device to identify a geographic location of events depicted in the form of media, the request comprising geographic location information describing the location of the wireless device. The geographic location information describing the location of the wireless device can be generated through the use of GPS, triangulation, user self-reported location information, or any other suitable method. The request can be generated according to methods described in relation to FIGS. 3-5, above.

In block 820, a determination is made as to whether the geographic location of events depicted in the media is within a geographic radius of the geographic location of the wireless device by consulting databases. The determination can occur at the server. According to other embodiments of the invention, the determination can occur on the wireless device. This is useful for a wireless device that does not have wireless communication capabilities.

As discussed above, a geographic radius can be provided by the user of the wireless device or it can be determined by the server. For instance, a user could select the geographic radius of 10 miles, or 100 miles, or any other denomination.

At block 830 a set of events depicted in the media is presented. The events are located within a geographic radius of the wireless device. The presentation can be in a form depicted in relation to FIGS. 6 and 7, described in detail above.

Figure 9:
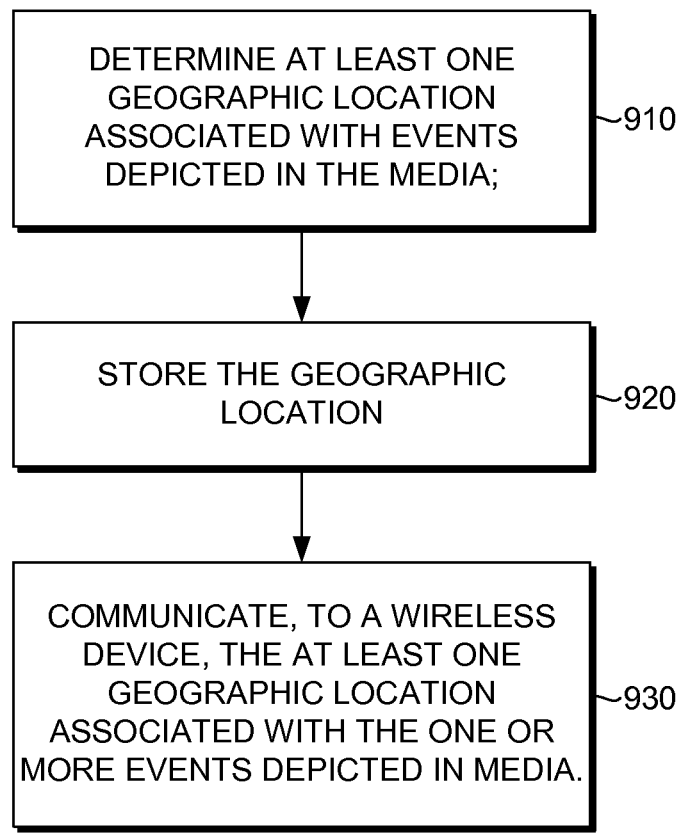
FIG. 9 depicts a flow diagram for a method of communicating geographic locations associated with events depicted in media to a wireless device.

Turning now to FIG. 9, a flow diagram is presented for a method of communicating geographic locations associated with events depicted in media in accordance with an embodiment of the invention. The method begins in block 910 with a determination of at least one geographic location associated with events depicted in media. As discussed above, there are multiple methods for determining the geographic location associated with an event depicted in media. Some embodiments of the invention can make use of metadata tags that can be embedded in the media, where the tags define the geographic locations associated with the event. Other embodiments can rely on users who have experienced or viewed the media to provide the geographic location information. This can take the form of a collaborative process, as discussed in FIG. 2, above.

At block 920, the geographic location is stored on computer-readable media. The geographic location can be stored in databases stored on computer-readable media in the server.

In block 930, the at least one geographic location associated with the events depicted in the media is communicated to a wireless device. The geographic location can be communicated to the wireless device through the network, and presented in a manner consistent with that of FIGS. 6 and 7.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media with computer executable instructions embodied thereon for performing a method of communicating geographic locations associated with one or more events depicted in a media to a wireless device, the method comprising:
   determining at least two geographic locations associated with one or more events depicted in a visual media, wherein a first geographic location is a physical location, said physical location being where the one or more events depicted in the media were created and a second geographic location is a geographic location extracted from a storyline associated with the one or more events depicted in the media;
   storing the at least two geographic locations on a non-transitory computer-readable media having a database; and
   communicating, to a wireless device, the one or more events depicted in the media when a geographic location of the wireless device matches the second geographic location.

2. The media of claim 1, wherein the determining comprises consulting one or more databases.

3. The media of claim 2, wherein the one or more databases include information describing the geographic location associated with the one or more events depicted in the media.

4. The media of claim 3, wherein the information is the geographic location of a perceived physical location, said perceived physical location being where the creators of the media intend the audience to believe the one or more events depicted in the media was actually created.

5. The media of claim 1, wherein the determining occurs in response to the presentation of the one or more events depicted in the media to a user, said user being associated with the wireless device.

6. The media of claim 1, further comprising: receiving the geographic location of the wireless device.

7. The media of claim 6, wherein one or more of the at least two geographic locations communicated to the wireless device are within a predefined geographic distance of the geographic location of the wireless device.

8. A computer-implemented method of communicating geographic locations associated with one or more events depicted in a media to a wireless device, the method comprising:
   determining at least two geographic location associated with one or more events depicted in a visual media, wherein a first geographic location is a physical location, said physical location being where the one or more events depicted in the media were created and a second geographic location is a geographic location extracted from a storyline associated with the one or more events depicted in the media;
   storing the at least two geographic locations on a non-transitory computer-readable media having a database; and
   communicating, to a wireless device, the one or more events depicted in the media when a geographic location of the wireless devices matches the second geographic location.

9. The method of claim 8, wherein the determining comprises consulting one or more databases.

10. The method of claim 9, wherein the one or more databases include information describing the geographic location associated with the one or more events depicted in the media.

11. The method of claim 8, wherein the determining occurs in response to the presentation of the one or more events depicted in the media to a user, said user being associated with the wireless device.

12. The method of claim 8, further comprising: receiving the geographic location of the wireless device.

13. The method of claim 12, wherein one or more of the at least two geographic locations communicated to the wireless device are within a predefined geographic distance of the geographic location of the wireless device.

14. The method of claim 12, wherein the second geographic location is of a perceived physical location, said perceived physical location being where the creators of the media intend the audience to believe the one or more events depicted in the media was actually created.

15. A computer server having a processor and non-transitory computer-readable media storing computer-useable instructions for a performing method of communicating geographic locations associated with one or more events depicted in a media to a wireless device, the server comprising:
   a processor that determines at least two geographic location associated with one or more events depicted in a visual media, wherein a first geographic location is a physical location, said physical location being where the one or more events depicted in the media were created and a second geographic location is a geographic location extracted from a storyline associated with the one or more events depicted in the media; and
   a non-transitory computer-readable media having a database that stores the at least two geographic locations, wherein the processor communicates, to a wireless device, the one or more events depicted in the media when a geographic location of the wireless device matches the second geographic location.

16. The server of claim 15, wherein the determining comprises consulting one or more databases that include information describing the geographic location associated with the one or more events depicted in the media.

17. The server of claim 15, wherein the determining occurs in response to the presentation of the one or more events depicted in the media to a user, said user being associated with the wireless device.

18. The server of claim 15, wherein one or more of the at least two geographic locations communicated to the wireless device are within a predefined geographic distance of the geographic location of the wireless device.

* * * * *